United States Patent
Hodge

(10) Patent No.: US 9,609,121 B1
(45) Date of Patent: Mar. 28, 2017

(54) SYSTEM AND METHOD FOR THIRD PARTY MONITORING OF VOICE AND VIDEO CALLS

(71) Applicant: **GLOBAL TEL*LINK CORP.**, Reston, VA (US)

(72) Inventor: Stephen Lee Hodge, Aubrey, TX (US)

(73) Assignee: **GLOBAL TEL*LINK CORPORATION**, Reston, VA (US)

( * ) Notice: Subject to any disclaimer, the term of this patent is extended or adjusted under 35 U.S.C. 154(b) by 0 days.

(21) Appl. No.: 15/093,300

(22) Filed: Apr. 7, 2016

(51) Int. Cl.
| | |
|---|---|
| H04M 3/00 | (2006.01) |
| H04M 3/22 | (2006.01) |
| H04N 7/14 | (2006.01) |
| G06K 9/00 | (2006.01) |
| G10L 17/22 | (2013.01) |
| H04M 3/42 | (2006.01) |

(52) U.S. Cl.
CPC ...... H04M 3/2281 (2013.01); G06K 9/00228 (2013.01); G06K 9/00597 (2013.01); G10L 17/22 (2013.01); H04M 3/42221 (2013.01); H04N 7/141 (2013.01)

(58) Field of Classification Search
CPC H04M 3/2281; H04M 3/42221; H04N 7/141; G06K 9/00597; G06K 9/00228; G10L 17/22
USPC .................. 379/188, 200, 249; 370/259, 352
See application file for complete search history.

(56) References Cited

U.S. PATENT DOCUMENTS

| | | | |
|---|---|---|---|
| 5,923,746 A | 7/1999 | Baker et al. | |
| 5,926,533 A | 7/1999 | Gainsboro | |
| 6,064,963 A | 5/2000 | Gainsboro | |
| 6,788,772 B2 | 9/2004 | Barak et al. | |
| 7,035,386 B1 | 4/2006 | Susen et al. | |
| 7,106,843 B1 | 9/2006 | Gainsboro et al. | |
| 7,406,039 B2 | 7/2008 | Cherian et al. | |
| 7,505,406 B1 | 3/2009 | Spadaro et al. | |
| 7,551,732 B2 | 6/2009 | Anders | |
| 7,783,021 B2 | 8/2010 | Hodge | |
| 7,853,243 B2 | 12/2010 | Hodge | |

(Continued)

FOREIGN PATENT DOCUMENTS

WO    WO 2016/028864 A1    2/2016

OTHER PUBLICATIONS

Defendant's Opening Claim Construction Brief, *Global Tel*Link Corporation v. Securus Technologies, Inc.*, Case No. 3:14-cv-0829-K (N.D. Tex.), filed Nov. 19, 2014.

Defendant's Responsive Claim Construction Brief, *Global Tel*Link Corporation v. Securus Technologies, Inc.*, Case No. 3:14-cv-0829-K (N.D. Tex.), filed Dec. 10, 2014.

(Continued)

*Primary Examiner* — Quynh Nguyen
(74) *Attorney, Agent, or Firm* — Sterne, Kessler, Goldstein & Fox P.L.L.C.

(57) ABSTRACT

A system is described herein that facilitates the monitoring of inmate communications. The system provides a remotely-accessible means for a reviewer to monitor a call between an inmate and another person. The system includes a monitoring server and a monitoring station. The monitoring server is configured to receive a call and call information from a communication center and process the call for monitoring, schedule a review of the call; and store the call, the call information, and scheduling data. The monitoring station is configured to receive the call and the call information from the monitoring server based on the scheduling data, and to display the identifying information and facilitate the review of the call.

20 Claims, 10 Drawing Sheets

(56) References Cited

U.S. PATENT DOCUMENTS

| 7,881,446 | B1 | 2/2011 | Apple et al. |
| 7,899,167 | B1 | 3/2011 | Rae |
| 8,295,446 | B1 | 10/2012 | Apple et al. |
| 8,929,525 | B1 | 1/2015 | Edwards |
| 9,143,609 | B2 | 9/2015 | Hodge |
| 9,396,320 | B2 | 7/2016 | Lindemann |
| 2004/0029564 | A1 | 2/2004 | Hodge |
| 2006/0285650 | A1 | 12/2006 | Hodge |
| 2008/0096178 | A1 | 4/2008 | Rogers et al. |
| 2011/0244440 | A1 | 10/2011 | Saxon et al. |
| 2011/0279228 | A1 | 11/2011 | Kumar et al. |
| 2014/0313275 | A1* | 10/2014 | Gupta .................... H04N 7/141 348/14.06 |
| 2015/0215254 | A1* | 7/2015 | Bennett .................. H04L 51/12 709/206 |
| 2015/0221151 | A1 | 8/2015 | Bacco et al. |

OTHER PUBLICATIONS

Excerpts from the Prosecution History of U.S. Pat. No. 7,899,167, U.S. Appl. No. 10/642,532, filed Aug. 15, 2003.
File History of U.S. Pat. No. 9,143,609, U.S. Appl. No. 13/949,980, filed Jul. 24, 2013.
Joint Claim Construction and Prehearing Statement, Exhibit B: Securus' Intrinsic and Extrinsic Evidence Charts, *Global Tel\*Link Corporation* v. *Securus Technologies, Inc*., No. 3:14-cv-00829-K (N.D. Tex.), Sep. 26, 2014.
Parties' Proposed Claim Constructions in *Global Tel\*Link corporation* v. *Securus Technologies, Inc*., No. 3:14-cv-00829-K (N.D. Tex.), filed Sep. 26, 2014; 17 pages.
Prosecution History of U.S. Appl. No. 11/045,589, filed Jan. 28, 2005.
Prosecution History of U.S. Appl. No. 12/002,507, filed Dec. 17, 2007.
U.S. Appl. No. 60/607,447, "IP-based telephony system and method," to Apple, et al., filed Sep. 3, 2004.

* cited by examiner

SYSTEM AND METHOD FOR THIRD PARTY MONITORING OF VOICE AND VIDEO CALLS

BACKGROUND

Field

The disclosure relates to a monitoring system that facilitates third party monitoring of inmate audio and video communications.

Background

Correctional facilities provide inmates with the ability to communicate with friends, families, and visitors as it improves recidivism and provides incentives for inmates to follow rules and policies of the facility. In addition to traditional telephone calls and telephone visitations, correctional facilities seek to offer a wide variety of communication services to inmates, such as video visitation and video calls, among others. However, as the amount of communication options available to inmates increases, an increased amount of monitoring is required for these communications.

BRIEF DESCRIPTION OF THE DRAWINGS/FIGURES

The accompanying drawings, which are incorporated herein and form a part of the specification, illustrate embodiments of the present disclosure and, together with the description, further serve to explain the principles of the disclosure and to enable a person skilled in the pertinent art to make and use the embodiments.

Figure 1:
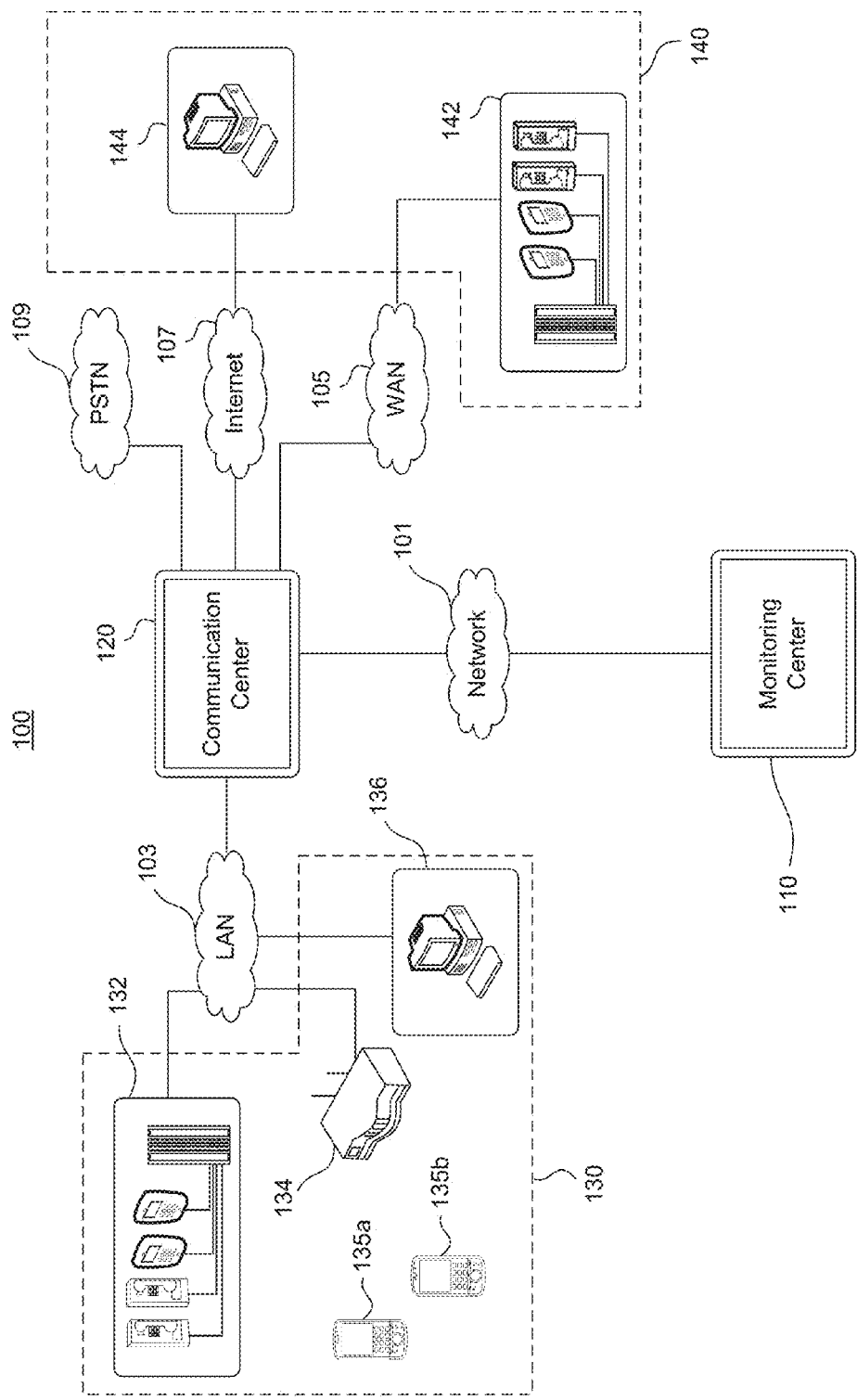
FIG. 1 illustrates a block diagram of a monitoring system, according to exemplary embodiments of the present disclosure.

The present disclosure will be described with reference to the accompanying drawings. In the drawings, like reference numbers indicate identical or functionally similar elements. Additionally, the left most digit(s) of a reference number identifies the drawing in which the reference number first appears.

DETAILED DESCRIPTION

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the invention. Rather, the scope of the invention is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc. Further, any of the implementation variations may be carried out by a general purpose computer, as described below.

For purposes of this discussion, any reference to the term "module" shall be understood to include at least one of software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Overview

Communication between inmates and outsiders has been shown to be an extremely important part of rehabilitation. Allowing for an inmate to keep in contact with friends and family significantly helps to reduce recidivism as well as to prepare an inmate for life after prison. Because most inmates are eventually released back into the public, any steps to minimize problems with their re-assimilation with society are highly beneficial.

Traditionally, communications between inmates and outsiders only included telephone calling and letter writing. However, over the years, newer technologies such as email, texting, and video calling have been used by correctional facilities. Typically, some form of monitoring has been used by correction facilities for all these types of communications.

In the case of telephone and video calling, a large amount of time is required to monitor the audio and video communications. Specifically, in typical monitoring systems, a reviewer, such as an officer, listens to an audio communication or watches a video communication of an inmate communicating with an outsider. In general, the monitoring systems allow the reviewer to listen to or watch a communication live and/or the communication is recorded for later review. However, most correctional facilities do not have a sufficient amount of personnel available to monitor all of the audio or video communications of inmates. Therefore, many correctional facilities typically monitor a selective amount of live communications and record all remaining communications for later review if an investigation points to a particular inmate, a phone number, or a time of day of an event. Based on the limited amount of personnel, many correctional facilities are forced to limit an amount of calls that each inmate may have during a time period (e.g., 1 call per day) and/or an amount of time that each inmate may have during a time period (e.g., 300 minutes a month).

In addition to recording communications, typical monitoring systems also have capabilities to convert speech to text which allows a reviewer to search for key words or phrases. However, Many of these technologies do not go far enough to detect covert communications such as slang, jargon, or body jesters that are not typically used in describing criminal activity.

In light of the above, the present disclosure provides a system to allow a third party to monitor voice and video calls. This consists of a monitoring system that allows a reviewer to remotely listen to an audio call or watch a video call and provide alerts to either officers or administrators regarding any suspicious behavior or communication between an inmate and an outsider such as family, friends, or another inmate. By providing a monitoring system for managing the different communications, a significant burden can be removed from officers and administrators, while simultaneously increasing inmates communication time.

Monitoring System

FIG. 1 illustrates a block diagram of a monitoring system 100, according to exemplary embodiments of the present disclosure. The monitoring system 100 includes a monitoring center 110 configured to receive communication session data from a communication center 120. In this disclosure, a session refers to a communication between two parties, in particular, an audio or video communication between an inmate using an inmate communication device 130 and an outsider using a communication device 140. The session data may include the session itself and data related to the session, as will be described in further detail below. The monitoring center 110 connects to the communication center 120 via a network 101. The network 101 may include a Local-Area Network (LAN), a Wide-Area Network (WAN), or the internet.

In an embodiment, the communication center 120 connects the inmate communication device 130 to the communication device 140. The inmate communication device 130 includes any or all devices such as an audio and video communications device(s) 132, wireless devices 135a or 135b, and/or a control station 136. The communication center 120 also connects to a wireless access point 134 (e.g., a router), which may provide connectivity to the wireless devices 135a and 135b. The communication center 120 connects to the inmate communication device 130 via a LAN 103.

The communication center 120 connects to the communication device 140 via any or all of a WAN 105, the internet 107, and the Public Switched Telephone Network (PSTN) 109. The WAN 105 may facilitate communications with other nearby prisons, such as those within the same county, state, etc. Audio and/or video devices 142 located at those other facilities may provide cross-facility visitations between inmates. In an embodiment, WebRTC may be utilized in place of a session initiation protocol (SIP) over a WAN or the internet, each of which provides a dedicated, private link between the inmate communication device 130 and the communication device 140.

The internet 107 is utilized to provide access to remote stations 144 such as remotely distributed control stations, scheduling clients, and home visitation devices. The PSTN 109 can be used to provide connectivity to basic telephones and other communication devices (not shown) over traditional data networks.

Monitoring Center

Figure 2:
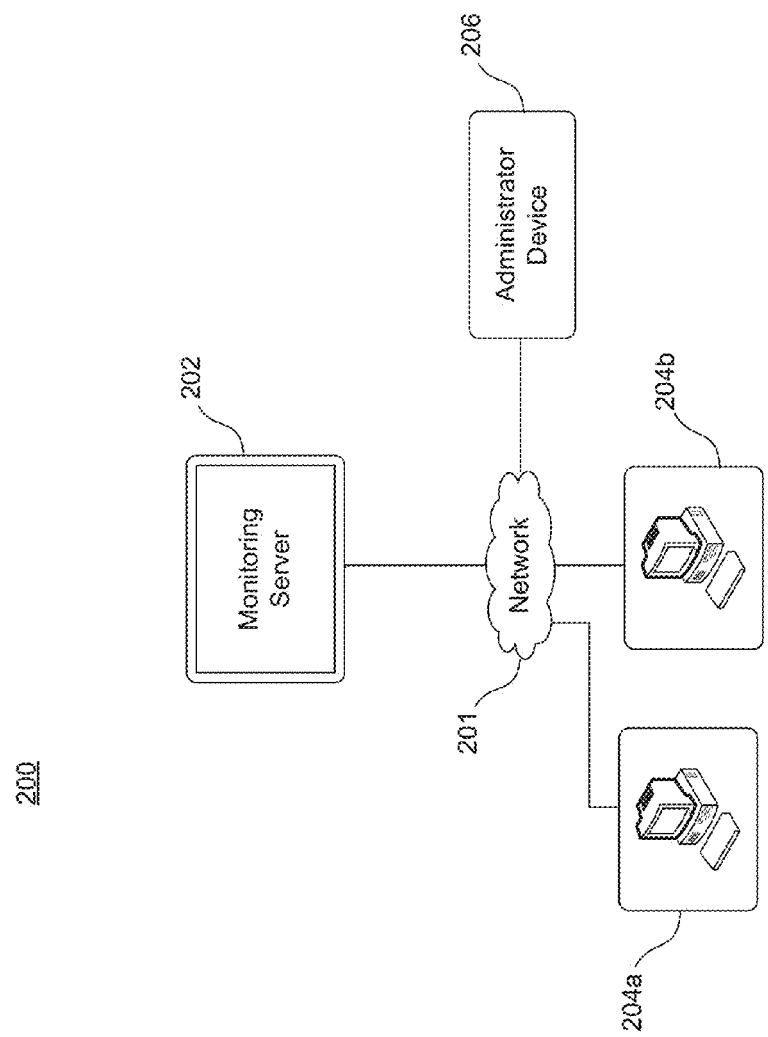
FIG. 2 illustrates a block diagram of a monitoring center, according to exemplary embodiments of the present disclosure.

FIG. 2 illustrates a block diagram of a monitoring center 200, according to exemplary embodiments of the present disclosure. The monitoring center 200 may be an exemplary embodiment of the monitoring center 110 of FIG. 1. The monitoring center 200 includes a monitoring server 202 which communicates with monitoring stations 204a and 204b and with an administrator device(s) 206. For example, the monitoring server 202 interfaces with the monitoring stations 204a and 204b and/or the administrator device(s) 206 via a network 201 when receiving session data from the communication center 120 and can transmit the session data to at least one of the monitoring stations 204a and 204b or the administrator device(s) 206.

The monitoring center 200 also allows communication between the monitoring stations 204a and 204b and the administrator device(s) 206. For example, a monitoring station 204a may communicate with the administrator device 206 to provide information or an alert in regards to a particular session received from the communication center 120.

In an embodiment the monitoring center 200 is further configured to interrupt and/or disconnect a communication between parties of a live communication session. For example, the monitoring stations 204a or 204b is configured to facilitate a reviewer to interrupt a communication session and issue a warning to either of or both sides of the communication session. The warning may be of the same format as the monitored communication session—voice, text (chat), or video. The occurrence of an interrupting event may be clearable in session logs. As another example, the monitoring stations 204*a* or 204*b* may be configured to disconnect a communication session between the parties, and the monitoring center may superimpose an audible or visual message that is played to the parties of the session describing the reason for the disconnection of service. A disconnection event can be clearly flagged in session logs. Further, the capability of interrupting or disconnecting a communication session may be limited to only be allowed if configured in the system on a user by user profile basis.

In an embodiment, the administrator device(s) 206 can include one or more of a phone, computer, tablet, fax machine, or pager having a capability of receiving a communication from monitoring station 204*a* or 204*b*. For example, a reviewer using the monitoring station 204*a* can send an email alert to an administrator, and the administrator can view the email alert by way of a phone, a computer, and/or a tablet that represent the administrator devices 206.

The network 201 can include a LAN, a WAN, or the internet. Accordingly, the monitoring center 200 can be located on-site or at a remote monitoring location, and allows monitors, corrections officers, or others to monitor a session between an inmate and an outsider in real-time, on delay, or in the form of an audio or video recording.

Monitoring Server

Figure 3:
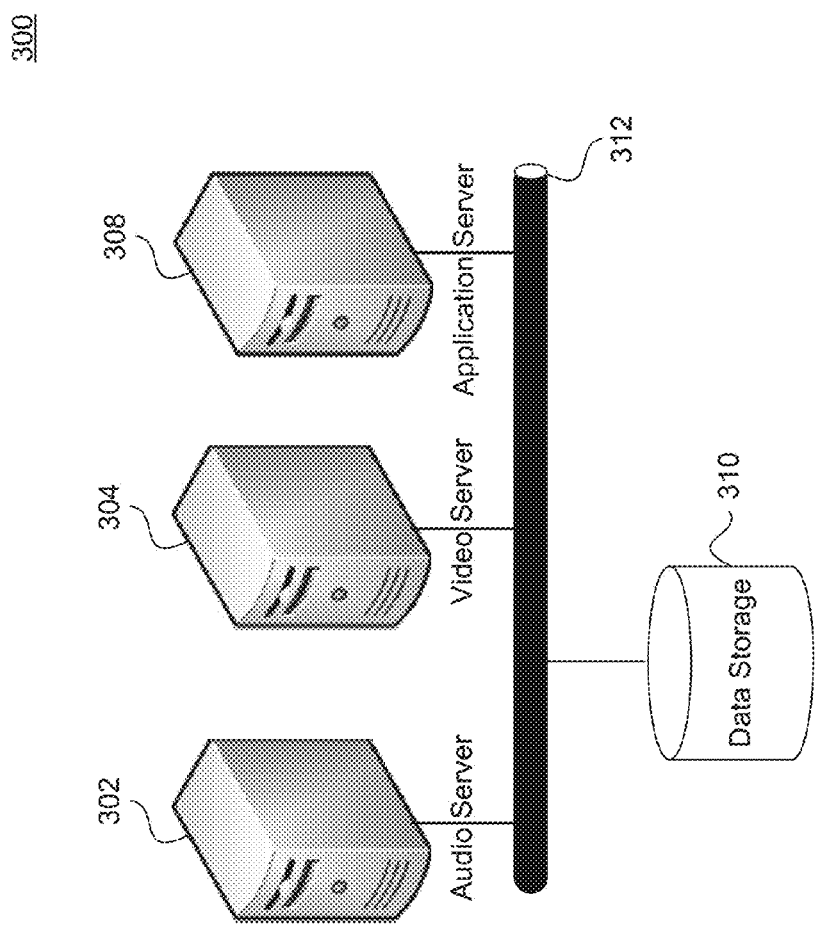
FIG. 3 illustrates a block diagram of a monitoring server, according to exemplary embodiments of the present disclosure.

FIG. 3 illustrates a block diagram of a monitoring server 300, according to exemplary embodiments of the present disclosure. The monitoring server 300 may represent an exemplary embodiment of the monitoring server 202 of FIG. 2. The monitoring server 300 includes an audio server 302, a video server 304, an application server 306, and data storage 310, that are all connected to each other via a network bus 312.

Each of the servers 302-306 can be constructed as individual physical hardware devices, or as virtual servers. The number of physical hardware machines can be scaled to match the number of simultaneous user connections desired to be supported in the monitoring system 100.

The audio server 302 can consist of any number of servers, and is configured to receive audio session data via the communication center 120. The audio server 302 supports sessions between inmates and outsiders that use audio devices such as an audio session between an inmate using the audio communication device 132 and an outsider using a telephone connected to the PSTN 109. The audio server 302 facilitates the real-time recording and delayed monitoring of audio sessions. The audio server 302 is configured to simultaneously record and transmit audio session data to the monitoring station 204*a* and/or 204*b*. For example, when an inmate uses an the audio communication device 132 to have a audio session with another inmate using the audio communication device 142, the audio server 302 receives audio session data from the communication center 120, records the audio session data, and transmits the audio session data to the monitoring station(s) 204*a* and/or 204*b*. The audio server 302 may store audio session as audio files on an internal storage or an external storage, as will be explained in more detail below.

The video server 304 can consist of any number of servers, and is configured to receive video session data via the communication center 120. The audio server 302 supports video sessions between inmates and outsiders that use video devices such as a video session between an inmate using the video communication device 132 and an outsider using the video communication device 142. The video server 304 facilitates the real-time and delayed monitoring of video sessions. The video server 304 is configured to simultaneously record and transmit video session data to a monitoring station. For example, when an inmate uses the wireless device 135*a* to have a video session with a family member using the remote station 144, the video server 304 can receive video session data via the communication center 120, record the video session data, and transmit the video session data to the monitoring station(s) 204*a* and/or 204*b*. The video server 304 may store the video sessions as video files on an internal storage or an external storage, as will be explained in more detail below.

Because there may be a variety of different video communication standards employed by different video devices that wish to participate in video calls, in an embodiment, the video server 304 may also perform real-time format conversion. The conversion my convert incoming signals as needed, or may convert outgoing signals to be compatible with monitoring stations 204*a* and 204*b*.

Because the audio server 302 and the video server 304 receive and transmit session data by way of a network, in an exemplary embodiment, both the audio server 302 and the video server 304 can decrypt received session data and encrypt session data prior to transmitting the session data, for security purposes. Further, The audio server 302 and the video server 304 may record or store audio and video files on either internal storage or the data storage 310.

Figure 4:
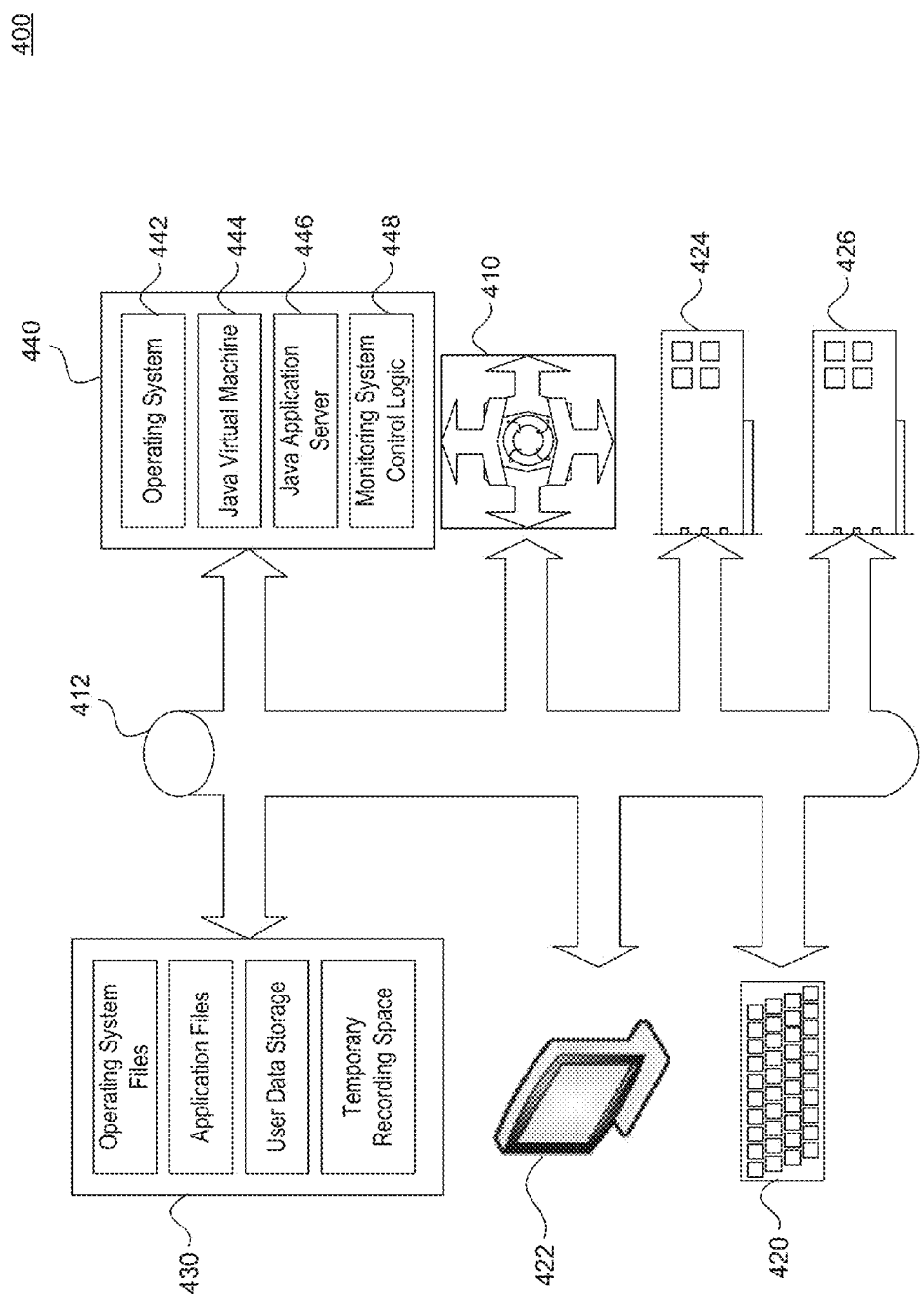
FIG. 4 illustrates an application server, according to exemplary embodiments of the present disclosure.

FIG. 4 illustrates an application server 400, according to exemplary embodiments of the present disclosure. The application server 400 may represent an exemplary embodiment of the application server 306 depicted in FIG. 3. The application server 400 functions as the primary logic processing center in the monitoring system 100. The application server 400 includes one or more central processing units (CPU) 410 connected via a bus 412 to several other peripherals. Such peripherals include an input device, such as a keyboard and/or mouse 420, a monitor 422 for displaying information, a network interface card 424 and/or a modem 426 that provide network connectivity and communication.

The application server 400 also includes internal data storage 430. This data storage 430 is non-volatile storage, such as one or more magnetic hard disk drives (HDDs) and/or one or more solid state drives (SSDs). The data storage 430 is used to store a variety of important files, documents, or other digital information, such as the operating system files, application files, user data, and/or temporary recording space.

The application server 400 also includes system memory 440. The system memory 440 is preferably faster and more efficient than the data storage 430, and is configured as random access memory (RAM) in an embodiment. The system memory 440 contains the runtime environment of the application server, storing temporary data for any of the operating system 442, java virtual machine 444, java application server 446, and monitoring control logic 448.

Figure 5:
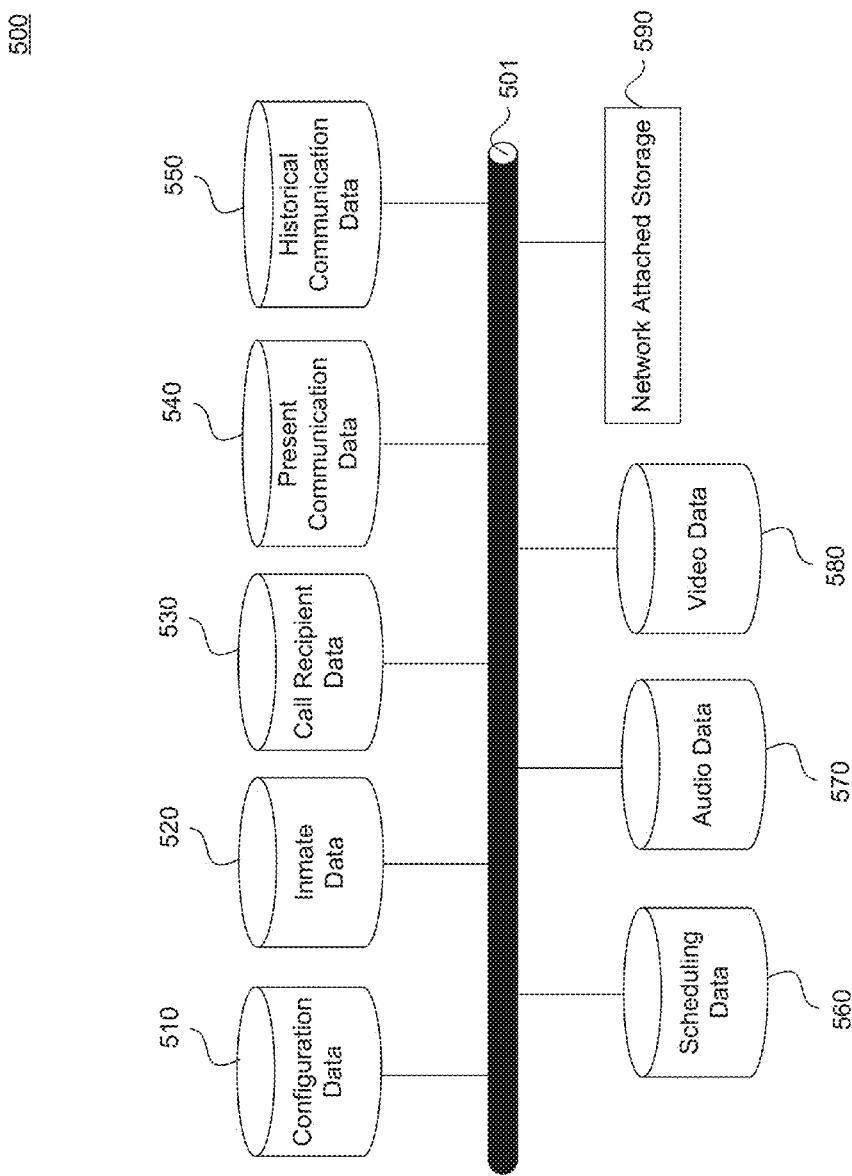
FIG. 5 illustrates a block diagram of storage devices, according to exemplary embodiments of the present disclosure.

FIG. 5 illustrates a block diagram of storage devices 500, according to exemplary embodiments of the present disclosure. The storage devices 500 may represent an exemplary embodiment of the data storage 310 of FIG. 3.

As shown in FIG. 5, the storage devices 500 provide access to a wide variety of data. The configuration data store 510 allows the system to be configured with a variety of different hardware types and manufacturers, and allow for more error-free interface and monitoring at the monitoring stations 204*a* and 204*b*. The configuration data store 510 may also include the connection details of one or more hardware devices anticipated to be used for audio or video sessions received from the communication center 120, such as the video and audio servers, web servers, application servers, and remote devices. Inmate data store 520 includes information about individual inmates, such as name, address, commitment information, etc. The inmate data store 520 may also include information relating to the case workers or correctional officers assigned to the inmate. These records may be directly entered, or may be obtained from an Inmate Telephone System, Jail Management System, or the communication system 120.

Although information regarding an outsider may be directly stored in the respective databases, an outsider data store 530 may be provided in an embodiment to separately store outsider information. The outsider information may include a name or identity and/or contact information, such as phone or address, of the outsider that is communicating with the inmate. The outsider information may also be identified in various ones of the data stores 510-580 by name or identifier only and this name/identifier may include a link to full biographical information of the outsider in the outsider data store 530.

Real-time communication data store 540 receives and temporarily stores information regarding a current ongoing session. The real-time communication information is received from the communication center 120 and may include session annotations, bookmarks, or alerts from a reviewer and/or connection data regarding a currently reviewed audio or video session. For example, the real-time communication data store 540 can receive session data regarding a detected three-way call in an audio session, such as by the detection of a hook-flash or other indicating event, and/or any other event that can be generated by a telephone.

Historical communication data store 550 stores information relating to prior audio and video sessions. The information included within these records can consist of prior session data of the inmate involved in the session, the outsider, the resources used for prior calls, including the type of devices used by each of the parties, the date/time of the audio or video sessions, the duration, etc. This information can be populated by the application server 400 by tracking and monitoring visits, and recording the data associated therewith.

Scheduling data store 560 stores session events that have not yet occurred as well as historical session information (e.g., session records). In this regard, the scheduling data store 560 stores a calendar of scheduled sessions, as well as information relating to those scheduled sessions, such as the parties to be involved, their contact information, and the communication devices to be used by those individuals. The session schedule records may include links to data relating to any of the involved parties, including inmates, visitors, and correctional staff (if needed). In an embodiment, a separate data store can be used to store the session records. Further, in an embodiment, the session records may include a link to the original session reservation, any recordings or transcripts of the session, and/or a list of the actual resources used, if they differ from the scheduled resources.

The scheduling data store 560 also stores monitoring station assignments including historical, present, and future assignments for reviewers. In particular, the monitoring station assignments can include information indicating audio or video sessions that have or will be reviewed, the identity of reviewer(s) that have been or are scheduled to review the audio or video sessions, monitoring station identification, date/time and duration of a review, etc.

Audio data store 570 can store audio files created from the audio session data received from the communication center 120. The audio data store 570 can also store modified audio files such as those that have been reviewed and annotated. The audio data store 570 may function as a temporary storage for an audio file in situations such as during creation of a non-modified audio file or modified audio file. The audio data store 570 may be used as the primary storage for the audio server 302 or used as a backup for the audio server 302.

Video data store 580 can store video files created from the video session data received from the communication center 120. The video data store 580 can also store modified video files such as those that have been reviewed and annotated. The video data store 580 may function as a temporary storage for an video file in situations such as during creation of a non-modified video file or modified video file. The video data store 580 may be used as the primary storage for the video server 304 or used as a backup for the video server 304.

Because the data stored on the data stores 510-580, especially audio and video files, consume significant amounts of storage space, this data can be stored on a Network Attached Storage (NAS) device 590 configured as a mass storage device. The data stores 510-580 may include links and/or pointers to recording data located on the NAS device 590. In order to reduce the required size of the NAS device 590, the NAS device preferably includes a backup routine to transfer recording data to permanent storage devices, such as archival permanent storage or optical disks, after a predetermined time has elapsed since the initial recording of that data. The NAS device 590 is connected to the data stores by way of the network 501.

Monitoring Station

Figure 6:
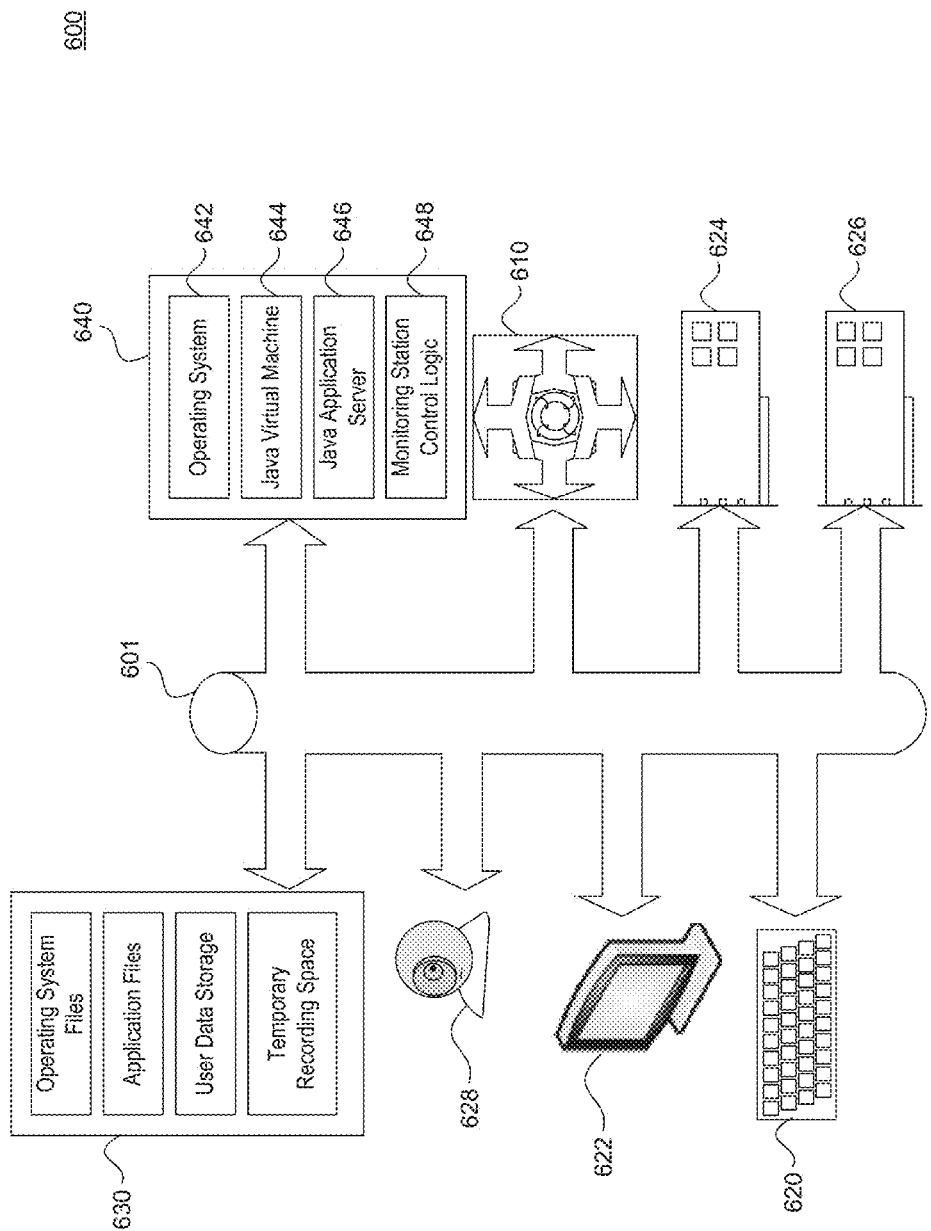
FIG. 6 illustrates a monitoring station, according to exemplary embodiments of the present disclosure.

FIG. 6 illustrates a monitoring station 600, according to exemplary embodiments of the present disclosure. The monitoring station 600 may be an exemplary embodiment of the monitoring station 204a or 204b of FIG. 2. The monitoring station 600 functions as a remote reviewing center in the monitoring system 100. The monitoring station 600 may include a computer, tablet, or phone capable of viewing a user interface and includes one or more central processing units (CPU) 610 connected via a bus 601 to several other peripherals. Such peripherals include an input device, such as a keyboard and/or mouse 620 and a camera and/or microphone 628, a monitor 622 for displaying a user interface (e.g., FIG. 7), a network interface card 624 and/or a modem 626 that provide network connectivity and communication.

The monitoring station 600 also includes internal data storage 630. This data storage 630 is non-volatile storage, such as one or more magnetic hard disk drives (HDDs) or solid state drives (SSDs). The data storage 630 is used to store a variety of important files, documents, or other digital information, such as the operating system files, application files, user data, and/or temporary recording space.

The monitoring station 600 also includes system memory 640. The system memory 640 is preferably faster and more efficient than the data storage 630, and is configured as random access memory (RAM) in an embodiment. The system memory 640 contains the runtime environment of the monitoring station, storing temporary data for any of the operating system 642, java virtual machine 644, java application server 646, and monitoring station control logic 648.

Figure 7:
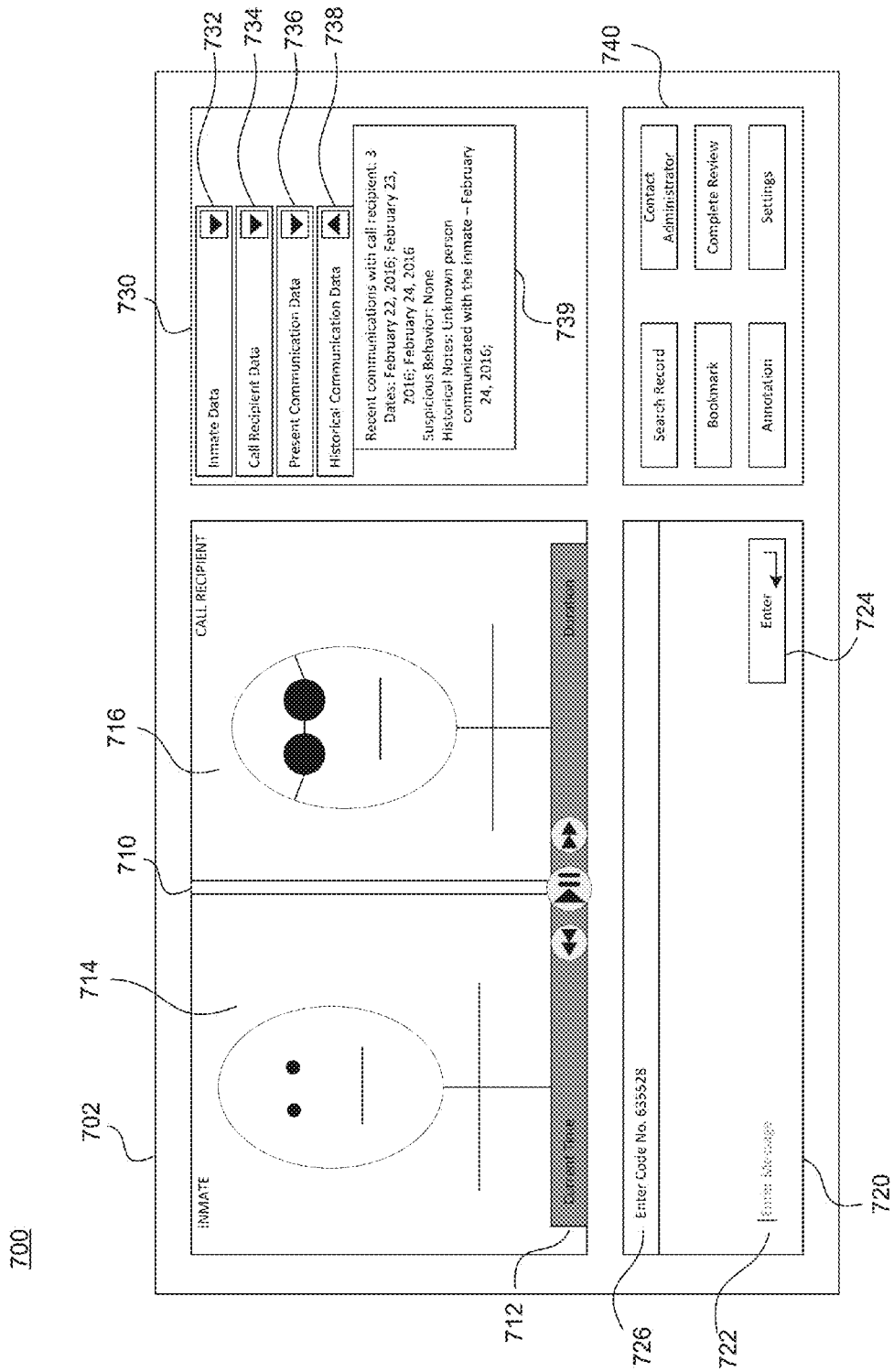
FIG. 7 illustrates a user interface of a monitoring station, according to exemplary embodiments of the present disclosure.

FIG. 7 illustrates a user interface 700 of a monitoring station, according to exemplary embodiments of the present disclosure. The user interface 700 may represent an exemplary embodiment of a user interface for the monitoring station 600 of FIG. 6. The user interface 700 includes an interface window 702 having different panels to facilitate review of a session between an inmate and an outsider. The interface window 702 includes a communication panel 710, a message panel 720, a data panel 730, and a control panel 740. The communication panel 710 includes a recordation panel 712 used to play, pause, rewind, and fast forward a communication. The recordation panel 712 includes time indicators such as a current time or a duration of the communication. For video calls, the communication panel 710 includes multiple screens 714 and 716 to show the inmate and the outsider. The screens 714 and 716 may include indicators of the inmate's name and the outsider's name and/or other identifying information of the parties involved.

The message panel 720 facilitates a reviewer in taking notes during a communication. The message panel 720 may include an outgoing message area 722 where a reviewer inserts a message by way of a input device, such as the keyboard 620 of FIG. 6. The outgoing message area 722 facilitates a reviewer in performing tasks such as entering a message into a record or sending a message to an administrator when the reviewer presses the enter button 724. The message panel 720 also includes an incoming message window 726 that displays messages received from the monitoring server 202. For example, the incoming message window 726 can display a code that the reviewer has to enter into the message area 722 to verify that a reviewer is performing monitoring duties. The incoming message window 726 may also display annotations/bookmarks or alerts created by a previous reviewer or that were automatically created by the audio server 302 or the video server 304 so as to alert the reviewer to suspicious behavior occurring at a particular time in the call. For example, while a reviewer is reviewing a session, the incoming message window 726 can display an annotation at a time during the session that a previous reviewer made the annotation.

The data panel 730 provides a reviewer with access to data that may be necessary for monitoring a communication. The data panel 730 is populated by data from the data stores 510-590. The data panel 730 can include an inmate data button 732, a outsider data button 734, a real-time communication data button 736, and a historical communications data button 738. When a reviewer pushes one of the buttons, data pertaining to the specific button is viewed in a data window. For example, as shown by FIG. 7, a reviewer may view historical communications of the inmate by clicking on the historical communications data button 738 to view data in the viewing window 739 pertaining to prior communications. The data viewed in the data window, for example viewing window 739, is populated from data stored on a data storage used by the monitoring server 202.

The control panel 740 includes controls for performing tasks while a reviewer monitors a session. The control panel 740 can include buttons for searching a record of the inmate, creating a bookmark at a specific time of the communication, creating an annotation at a specific time of the communication, contacting an administrator of the inmate, completing the review, and/or changing settings.

Monitoring Center Operation

Figure 8:
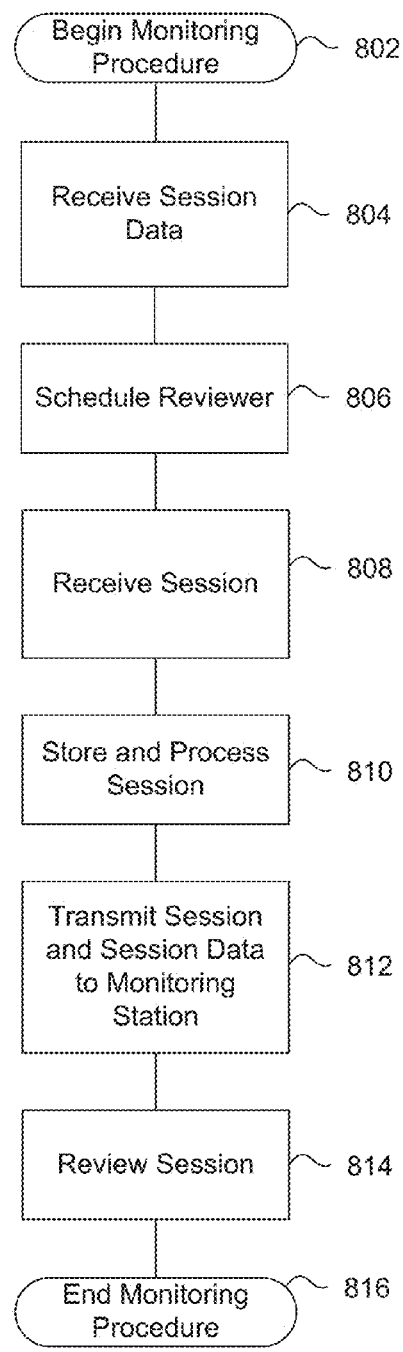
FIG. 8 illustrates a flowchart diagram of a method for monitoring a call, according to exemplary embodiments of the present disclosure.

The monitoring center 200 provides monitoring capabilities for a third party reviewer and capabilities in supervising the reviewer. An operation of the monitoring center 200 will be described with respect to FIG. 8, which illustrates a flowchart diagram of a method 800 for monitoring a call, according to exemplary embodiments of the present disclosure. Although the physical devices and components that form the system have largely already been described, additional details regarding their more nuanced operation will be described below with respect to FIGS. 1-7.

The monitoring center 200 begins a monitoring procedure (802). The monitoring server 202 receives session data associated with a scheduled session, either voice or video session, from the communication center 100 (840). In an embodiment, the session data may be received prior to the session or simultaneously with the session. However, as described for this exemplary embodiment, the session data is received prior to receipt of an associated session. Upon receiving the session data, the monitoring center may assign an identification to the session data. The identification is used for scheduling purposes and associates a scheduled session to inmate records.

The monitoring server 202 then schedules a reviewer to the scheduled session (806). In scheduling a reviewer, the monitoring server 202 coordinates between such stored data as the inmate data, reviewer availability, outsider data, or historical communication data. For example, the monitoring server 202 can schedule a reviewer based on whether a real-time monitoring is required for a particular inmate or outsider per the data stored in the inmate data store 520, the outsider data store 530, and the historical communication data store 550.

The monitoring server 202 receives the scheduled session (808) and begins recording and processing the session and session data (810). For example, monitoring server 202 can process the session to link present communication data received such that the inmate's phone number and the outsider's phone number are linked to the session. Further, the monitoring server 202 can process the session by inserting timestamps within or retrieving timestamps from a session file. For example, the monitoring server 202 can insert a timestamp at predetermined segment lengths (e.g., every 10 seconds) of the session. The timestamps facilitate synchronization with annotation, bookmarks, alerts, etc. received from monitoring stations such that annotations/bookmarks/alerts from multiple reviewers may be viewed according to the time created in relation to the session. During the storing and processing of the session, the monitoring server 202 can simultaneously transmit the session data to at least one of the monitoring stations 204a and/or 204b (812).

Next, the session is reviewed at the monitoring station(s) 204a and/or 204b by a reviewer at 814. During the review of the session, which may be real-time or pre-recorded, the reviewer, by way of the user interface 700, can pause, rewind, and fast forward the session. Using the monitoring station, the reviewer can also view inmate data, outsider data, real-time communication data, and/or historical communication data if needed on the user interface.

As will be explained in more detail below, the monitoring server 202 and the monitoring stations 204a and 204b may further monitor the reviewer's progress on reviewing the session (814). After the session has been reviewed at (814), the monitoring server 202 ends the monitoring procedure (816).

Figure 9:
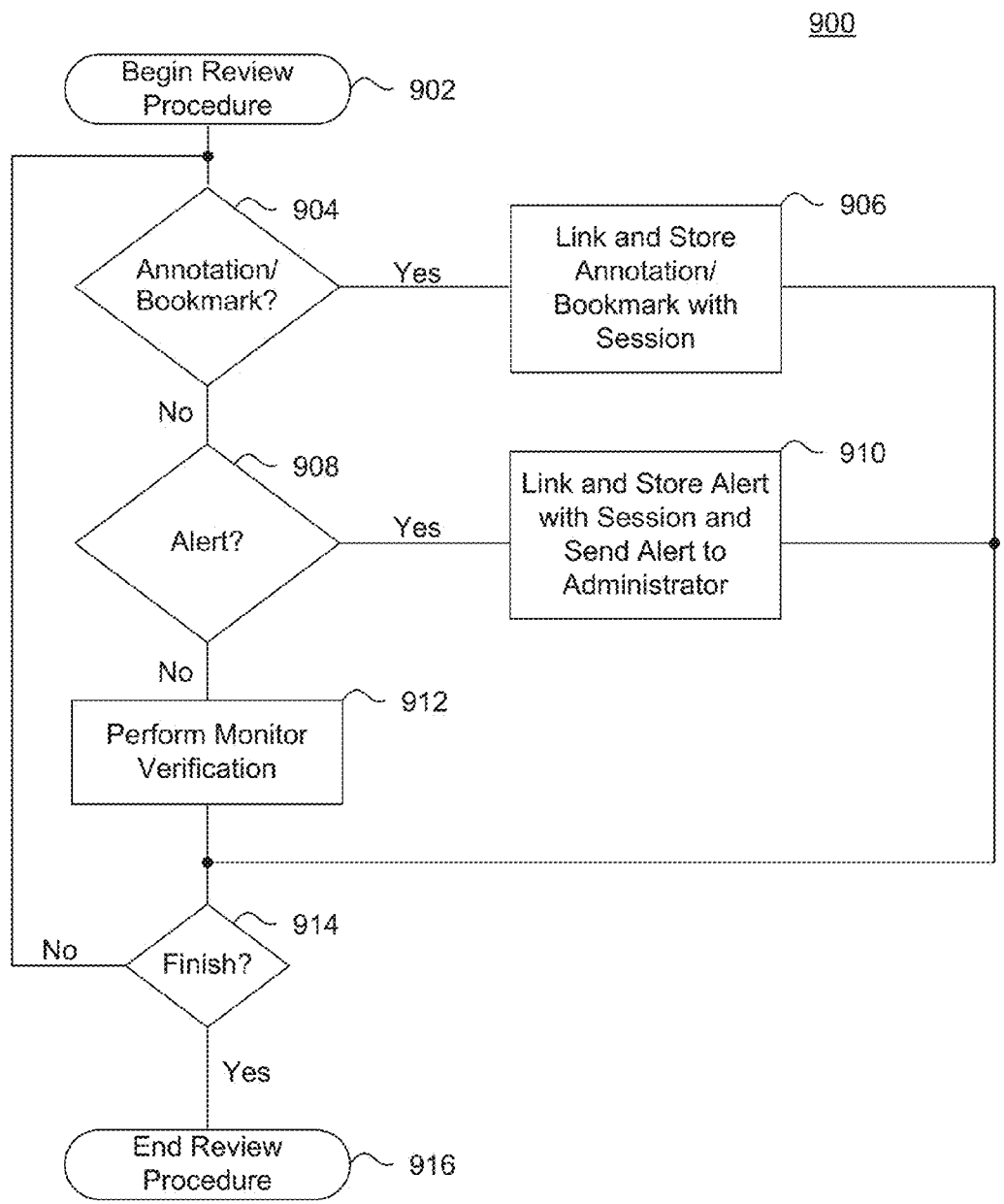
FIG. 9 illustrates a flowchart diagram of a method for reviewing a call and monitoring a reviewer, according to exemplary embodiments of the present disclosure.

FIG. 9 illustrates a flowchart diagram of a method 900 for reviewing a session and monitoring a reviewer, according to exemplary embodiments of the present disclosure. The method 900 may represent an exemplary embodiment of reviewing of a session (814) of FIG. 8. A review procedure can be performed by the monitoring server 202 and a monitoring station or by a monitoring station alone, as will be described in detail below. The following description will discuss a review procedure performed by the monitoring server 202 in conjunction with a monitoring station. When the monitoring server 202 transmits a session, either real-time or pre-recorded, and session data to a monitoring station, such as monitoring stations 204a and/or 204b, the review procedure begins (902).

The monitoring server 202 determines whether input data, such as an annotation, a flag, or a bookmark, has been received from the monitoring station 204a or 204b. If determined that an annotation/bookmark has been received, the monitoring server 202 stores the annotation/bookmark, tags the annotation/bookmark with an identifier, and links the annotation/bookmark with the session (906) such that the annotation/bookmark can be viewed separate from the session or viewed in conjunction with the session at the associated time of the session when the annotation/bookmark was created. The monitoring server 202 can match a timestamp of the session with a timestamp of when the annotation/bookmark was made by the reviewer. Synchronizing the annotation/bookmark facilitates future review of the session along with the annotation/bookmark. For example, if a first reviewer using monitor station 204a makes an annotation at a timestamp of 3 minutes in the call, a second reviewer can either view the annotation as a separate note or view the annotation in the incoming message screen 726 of FIG. 7 at the 3 minute mark of the session.

After storing and linking the annotation/bookmark, the monitoring server 202 determines whether the review procedure is finished (914). The determination of whether the review is finished can be based on multiple factors. Such factors may include whether the communication has ended and/or whether the reviewer has ended the monitoring session.

If no annotation/bookmark have been received, the monitoring server 202 determines whether additional input data such as an alert has been received (908) from the monitoring station 204a or 204b. If determined that an alert has been received, the monitoring server 202 stores the alert and links the alert with the call (910). Similar to a received annotation/bookmark, the monitoring server 202 synchronizes an alert such that the alert can be viewed at a particular time of the session when viewed at a later time. After storing and linking the alert, the monitoring system 202 determines whether the review procedure is finished (914).

Aside from providing recorded notes of a session, the annotations, bookmarks, and alerts also facilitate the monitoring of a reviewer. For example, when an annotation is received from a monitoring station, the monitoring server 202 determines that the reviewer is attentive and reviewing the session. However, when neither an annotation, bookmark, or an alert is received from a monitoring station within a predetermined time, the monitoring server 202 presumes that the reviewer is not properly monitoring the session. Accordingly, the monitoring server 202 can perform a monitor verification (912). The verification may be performed by the monitoring server 202 transmitting a verification command the monitoring station and requiring that the reviewer perform a simple task. The verification command may require a reviewer at the monitoring station 204a or 204b to perform a task. For example, the monitoring server 202 may transmit a message, such as shown in the incoming message window 726 of FIG. 7, that requires the reviewer to enter a code. As another example, the reviewer may be required to perform a biometric verification such as looking/speaking into a camera/microphone (e.g., the camera/microphone 628 of FIG. 6) for retinal, facial, and/or voice verification. The monitoring station 204a or 204b transmits a response to the verification command and based on whether the task is completed, the monitoring system can determine whether or not to finish the review procedure (914).

In an embodiment, the review process may be performed entirely by a monitoring station. For example, the monitoring station 204a may receive a session, either real-time or pre-recorded, and begin the review procedure (902). In receiving the session, the monitoring station 204a can download the session on to a local storage of the monitoring station 204a. Next, the monitoring station 204a can determine whether an annotation/bookmark is input by a reviewer (904). When determined that an annotation/bookmark has been input, the monitoring station 204a can store the annotation/bookmark on a local storage, tag the annotation/bookmark with an identifier, and synchronize the annotation/bookmark, by timestamp, with the session. Similarly, the monitoring station 204a can determine whether the reviewer wants to send an alert to an administrator (908). If determined that an alert is to be sent, the monitoring station 204a stores the alert on a local storage, tags the alert by an identifier, links the alert to a timestamp of the session, and sends the alert to the administrator.

Similar to the monitoring server 202, if no annotation/bookmark has been inputted or no alert has been submitted, the monitoring station 204a can perform a monitor verification (912) to determine whether the reviewer is attentive. The monitoring station 204a can determine whether the reviewer is being attentive based on the results of the monitor verification.

When the monitoring station 204a has determined that the review is finished (914), the monitoring station 204a uploads the annotations, bookmarks, and alerts to the monitoring server 202, and the review procedure is finished (916).

Exemplary Computer Implementation

It will be apparent to persons skilled in the relevant art(s) that various elements and features of the present disclosure, as described herein, can be implemented in hardware using analog and/or digital circuits, in software, through the execution of computer instructions by one or more general purpose or special-purpose processors, or as a combination of hardware and software.

Figure 10:
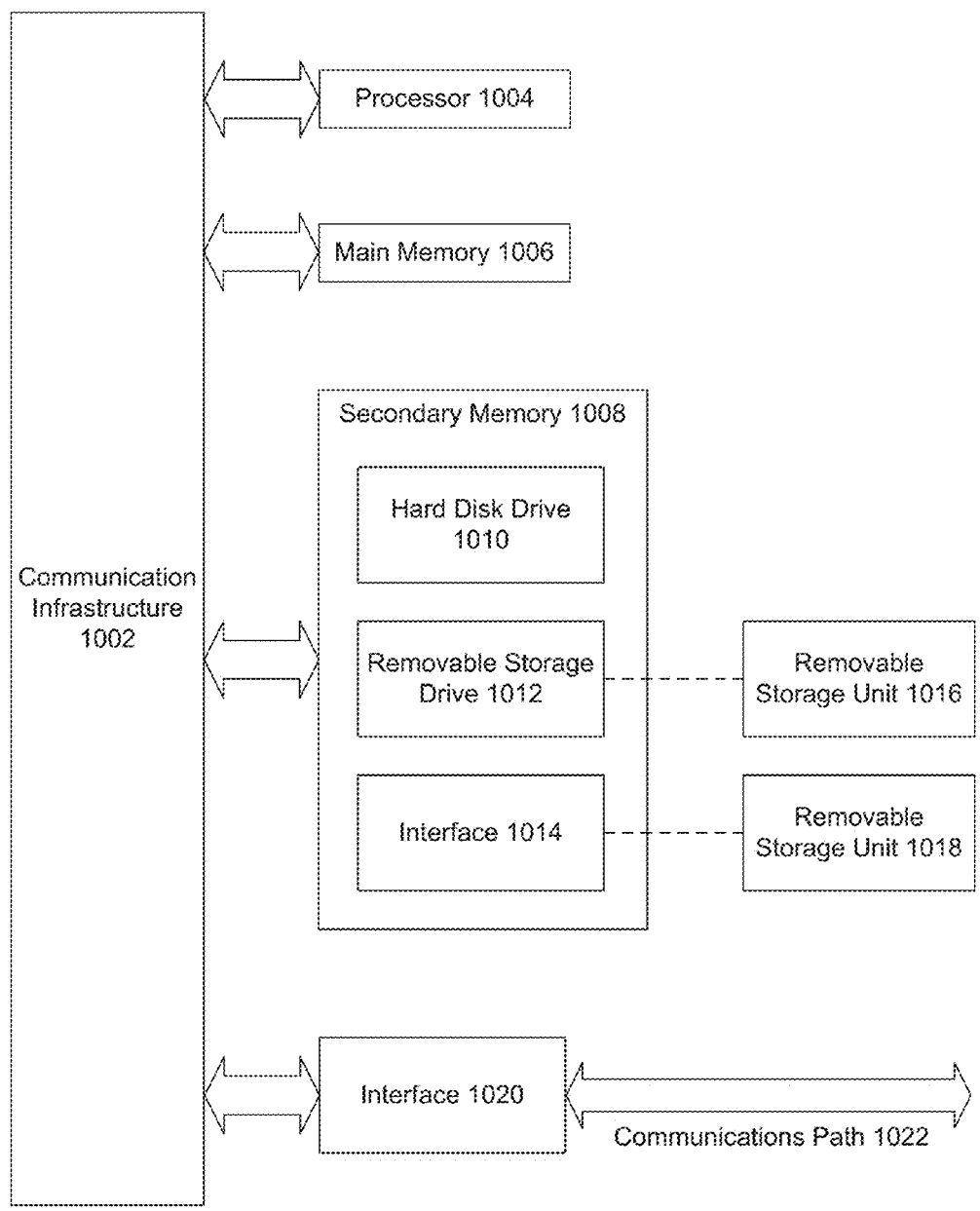
FIG. 10 illustrates a computer system, according to exemplary embodiments of the present disclosure.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. For example, the methods of FIGS. 8 and 9 can be implemented in the environment of one or more computer systems or other processing systems. An example of such a computer system 1000 is shown in FIG. 10. One or more of the modules depicted in the previous figures can be at least partially implemented on one or more distinct computer systems 1000.

Computer system 1000 includes one or more processors, such as processor 1004. Processor 1004 can be a special purpose or a general purpose digital signal processor. Processor 1004 is connected to a communication infrastructure 1002 (for example, a bus or network). Various software implementations are described in terms of this exemplary computer system. After reading this description, it will become apparent to a person skilled in the relevant art(s) how to implement the disclosure using other computer systems and/or computer architectures.

Computer system 1000 also includes a main memory 1006, preferably random access memory (RAM), and may also include a secondary memory 1008. Secondary memory 1008 may include, for example, a hard disk drive 1010 and/or a removable storage drive 1012, representing a floppy disk drive, a magnetic tape drive, an optical disk drive, or the like. Removable storage drive 1012 reads from and/or writes to a removable storage unit 1016 in a well-known manner. Removable storage unit 1016 represents a floppy disk, magnetic tape, optical disk, or the like, which is read by and written to by removable storage drive 1012. As will be appreciated by persons skilled in the relevant art(s), removable storage unit 1016 includes a computer usable storage medium having stored therein computer software and/or data.

In alternative implementations, secondary memory 1008 may include other similar means for allowing computer programs or other instructions to be loaded into computer system 1000. Such means may include, for example, a removable storage unit 1018 and an interface 1014. Examples of such means may include a program cartridge and cartridge interface (such as that found in video game devices), a removable memory chip (such as an EPROM, or PROM) and associated socket, a thumb drive and USB port, and other removable storage units 1018 and interfaces 1014 which allow software and data to be transferred from removable storage unit 1018 to computer system 1000.

Computer system 1000 may also include a communications interface 1020. Communications interface 1020 allows software and data to be transferred between computer system 1000 and external devices. Examples of communications interface 1020 may include a modem, a network interface (such as an Ethernet card), a communications port, a PCMCIA slot and card, etc. Software and data transferred via communications interface 1020 are in the form of signals which may be electronic, electromagnetic, optical, or other signals capable of being received by communications interface 1020. These signals are provided to communications interface 1020 via a communications path 1022. Communications path 1022 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 1016 and 1018 or a hard disk installed in hard disk drive 1010. These computer program products are means for providing software to computer system 1000.

Computer programs (also called computer control logic) are stored in main memory 1006 and/or secondary memory 1008. Computer programs may also be received via communications interface 1020. Such computer programs, when executed, enable the computer system 1000 to implement the present disclosure as discussed herein. In particular, the computer programs, when executed, enable processor 1004 to implement the processes of the present disclosure, such as any of the methods described herein. Accordingly, such computer programs represent controllers of the computer system 1000. Where the disclosure is implemented using software, the software may be stored in a computer program product and loaded into computer system 1000 using removable storage drive 1012, interface 1014, or communications interface 1020.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

CONCLUSION

It is to be appreciated that the Detailed Description section, and not the Abstract section, is intended to be used to interpret the claims. The Abstract section may set forth one or more, but not all exemplary embodiments, and thus, is not intended to limit the disclosure and the appended claims in any way.

The invention has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus, the invention should not be limited by any of the above-described exemplary embodiments, but should be defined only in accordance with the following claims and their equivalents.

What is claimed is:

1. A monitoring server for remotely monitoring an inmate communication session, the monitoring server comprising:
a network interface device configured to communicate with a remote monitoring station; and
at least one processor configured to:
transmit the inmate communication session to the remote monitoring station;
monitor data received from the remote monitoring station;
monitor a reviewer of the inmate communication session located at the remote monitoring station based on the data received from the remote monitoring station including input data from the reviewer;
transmit, to the remote monitoring station, a verification command for the remote monitoring station to perform a monitor verification process after a predetermined amount of time that no input data has been monitored; and
receive, from the remote monitoring station, a response to the verification command.

2. The monitoring server of claim 1, wherein input data at the remote monitoring station includes an annotation, a flag, or a bookmark related to the inmate communication session, and the input data at the remote monitoring station is stored and linked to the inmate communication session.

3. The monitoring server of claim 1, wherein the response to the verification command is an indication of whether the verification process was completed by the reviewer using the remote monitoring station.

4. The monitoring server of claim 1, wherein the verification command is a command for the remote monitoring station to display an input request for the reviewer.

5. The monitoring server of claim 1, wherein the at least one processor is further configured to generate scheduling data, which includes data designating at least one reviewer and a corresponding remote monitoring station to review the inmate communication session.

6. The monitoring server of claim 1, wherein the network interface device is further configured to communicate with a communication center, and the at least one processor is further configured to receive the inmate communication session from the communication center.

7. The monitoring server of claim 1, wherein the at least one processor is further configured to receive an alert from the remote monitoring station.

8. The monitoring server of claim 7, wherein the alert causes the at least one processor to send a communication from the remote monitoring station to an administrator device.

9. The monitoring server of claim 7, wherein the alert causes the at least one processor to connect the remote monitoring station with an administrator device for a direct communication between the reviewer and an administrator.

10. A monitoring station for monitoring an inmate communication session, the monitoring station comprising:
   a display;
   an input device;
   a network interface device configured to communicate with a remote monitoring server; and
   at least one processor configured to:
      receive the inmate communication session from the remote monitoring server;
      display the inmate communication session so as to facilitate a review of the inmate communication session;
      transmit data to the remote monitoring server for monitoring the reviewer, the data including input data from the reviewer;
      receive a verification command from the remote monitoring server after a predetermined amount of time that no input data has been monitored by the remote monitoring server, the verification command causing the monitoring station to perform a verification process to monitor a reviewer's progress with regard to monitoring the inmate communication session;
      perform a verification process in response to receiving the verification command, the verification process being performed according to a type of the verification command; and
      transmit, to the remote monitoring server, a response to the verification command indicating whether the reviewer is monitoring the inmate communication session.

11. The monitoring station of claim 10, wherein the at least one processor is further configured to transmit input data including an annotation, a flag, or a bookmark related to the inmate communication session to the remote monitoring server.

12. The monitoring station of claim 10, wherein the verification process is a request for the reviewer to perform an action.

13. The monitoring station of claim 12, wherein the input device is a keyboard and the request is a request for the reviewer to input a response to a question or to input a verification code.

14. The monitoring station of claim 12, wherein the input device is at least one of a camera or a microphone, and the request is for the reviewer to perform a biometric verification.

15. The monitoring station of claim 14, wherein the biometric verification is at least one of a voice verification, a facial verification, or a retinal verification of the reviewer.

16. The monitoring station of claim 10, wherein the response to the verification command is an indication of whether the verification process was completed by the reviewer.

17. A monitoring station for monitoring an inmate communication session, the monitoring station comprising:
   a display;
   an input device;
   a network interface device configured to communicate with a remote monitoring server; and
   at least one processor configured to:
      receive the inmate communication session from the remote monitoring server;
      display the inmate communication session so as to facilitate a review of the inmate communication session;
      monitor input data from a reviewer;
      perform a verification process to monitor a reviewer's progress with regard to monitoring the inmate communication session after a predetermined amount of time that no input data has been monitored; and
      terminate the display of the inmate communication session based on a result of the verification process.

18. The monitoring station of claim 17, wherein the input data includes one or more of an annotation, a flag, or a bookmark related to the inmate communication session.

19. The monitoring station of claim 17, wherein the input device is a keyboard, and the verification process includes a request for the reviewer to input a response to a question or to input a verification code.

20. The monitoring station of claim 17, wherein the input device is at least one of a camera or a microphone, and the request is for the reviewer to perform at least one of a voice verification, a facial verification, or a retinal verification.

* * * * *